2,811,412

METHOD OF RECOVERING URANIUM COMPOUNDS

Robert H. Poirier, Columbus, Ohio, assignor to the United States of America as represented by the United States Atomic Energy Commission No Drawing. Application March 31, 1952, Serial No. 279,689

4 Claims. (Cl. 23—14.5)

The process of this invention deals with the recovery of uranium values and in particular with the recovery of uranium compounds which have been adsorbed on anion exchange resins.

When processing uranium-containing ores, for instance monazite sand, one of the preferred methods comprises heating the sand in disintegrated form with sodium hydroxide whereby the metal values of the monazite sand are converted to the hydroxides, dissolving the isolated hydroxides in hydrochloric acid, and neutralizing the solution of chlorides obtained to a pH value of approximately 5.5 whereby uranium and thorium hydroxides precipitate while the rare earth values remain in solution. The uranium- and thorium-containing residue is then separated from the solution and leached with an alkali metal carbonate solution, whereby the uranium and thorium hydroxides are dissolved. For the separation of uranium from thorium this carbonate solution is then passed over an anion exchange resin whereby the uranium is adsorbed while the thorium remains in solution.

The uranium values have been recovered heretofore from the resin by eluting the latter with a sodium chloride solution, mineral acid, or first with a sodium chloride solution followed by hydrochloric acid. These elution methods, however, require preconditioning of the resin each time after desorption to make it usable for a new adsorption cycle.

It is an object of this invention to provide a process for the recovery of uranium values adsorbed on anion exchange resins whereby no conditioning step is necessary prior to reuse of the desorbed resin.

It is another object of this invention to provide a process for the recovery of uranium values adsorbed on anion exchange resins in which the resin is maintained in the carbonate form during elution so that it becomes ready for reuse immediately after desorption.

It is finally also an object of this invention to provide a process for the recovery of uranium values adsorbed on anion exchange resins in which the uranium may be recovered from the eluate in a very simple manner.

These and other objects are accomplished by contacting the uranium-holding resin with an aqueous carbonate solution whereby the uranium values are eluted from said resin, and heating the eluate whereby carbon dioxide and any ammonia are given off, the pH value of the solution is lowered and the uranium values are precipitated.

Various kinds of anion exchange resins have been found suitable for adsorbing uranium values from aqueous solutions; for instance, Amberlite IR–4B, which is a modified phenol formaldehyde polyamine condensate and Amberlite IRA–400, which is a polyquaternary ammonium chloride anion exchange resin, are operative; Amberlite IR–4B is manufactured by the procedure described in U. S. Patent No. 2,356,151, granted to John W. Eastes on August 22, 1944. However, strong-base resins are preferred. Details of the adsorption process proper using anion exchange resins can be found in the assignee's co-pending application, Serial No. 277,899, filed on March 21, 1952 by Garson A. Lutz, now Patent No. 2,780,514, issued February 5, 1957.

Various carbonate solutions have been found satisfactory for the elution of the uranium values from the resins; thus ammonium carbonate, ammonium bicarbonate, and sodium bicarbonate have given satisfactory results. Concentrations of these solutions ranging from 10 to 25% by weight have been found satisfactory. While elution with the 10% and 15% solutions yields a higher over-all recovery of the adsorbed uranium, solutions of a concentration of 20% have the advantage of yielding a more concentrated solution. This will be obvious from the example given later.

Elution of the uranium values from the resins with an ammonium carbonate solution according to this invention has a further advantage not encountered when the eluants previously used and enumerated above are employed. The uranium values were simply recovered from the eluants by heating the solutions, preferably to the boiling point, whereby ammonia and carbon dioxide were driven off, the pH value of the solutions was lowered, and the uranium was precipitated. This precipitation took place when a pH value of approximately 8 was reached. The precipitate had a yellow color and was found to contain from 60 to 75% of uranium; it probably consisted mainly of ammonium uranyl tricarbonate or of ammonium diuranate. In all cases more than 90% of the uranium present in the eluate was precipitated.

The ammonia and the carbon dioxide released during heating of the solution may be collected and reconverted to ammonium carbonate which may then be recycled and used anew. The over-all yield of one elution-precipitation cycle usually ranged between 75 and 100% with regard to the quantity of uranium adsorbed on the resin.

In the following an example is given of the process of this invention for illustrative purposes only and without the intention to have the scope of the invention limited to the details given therein.

EXAMPLE

A number of elution tests were carried out, each with 10 grams of Amberlite IRA–400. The resin had been preconditioned in a column by passing 1 liter of a 10% sodium carbonate solution through the resin. Over the resin thus treated 200 ml. of a 10% sodium carbonate solution were guided which contained 240 mg. of $U_3O_8$. All of the uranium of this solution was adsorbed by the resin.

Elution of the adsorbed uranium values was then effected with ammonium carbonate solutions, with ammonium bicarbonate solutions of different concentrations (in both cases the concentrations were 10, 15 and 20%) and also with a 10% solution of sodium bicarbonate; the flow rate was 100 ml. per hour. A total of 250 ml. of eluant was used for each test, and the eluate was collected in 25-ml. fractions; each fraction was analyzed for uranium. The results of these experiments are given in the following table. As has been pointed out above, the more diluted eluants yielded a better over-all recovery of uranium, while the 20% solutions resulted in an eluate having a higher uranium concentration, this particularly in the first few fractions.

*Quantity of uranium (mg. of $U_3O_8$) contained in each fraction of eluate*

| Fractions of Eluate | $(NH_4)_2CO_3$ as Eluant, Concentration, Percent | | | $NH_4HCO_3$ as Eluant, Concentration, Percent | | | $NaHCO_3$ as Eluant, Concentration, Percent |
|---|---|---|---|---|---|---|---|
| | 10 | 15 | 20 | 10 | 15 | 20 | 10 |
| 1 | <0.3 | 6.5 | 74.8 | 0.2 | 16.3 | 35.4 | 0.1 |
| 2 | 31.8 | 120.8 | 47.2 | 83.0 | 90.3 | 51.0 | 46.0 |
| 3 | 44.8 | 46.2 | 23.6 | 40.1 | 19.2 | 9.2 | 68.5 |
| 4 | 42.4 | 5.3 | 11.8 | 23.9 | 6.1 | 4.5 | 34.8 |
| 5 | 28.3 | 9.5 | 2.4 | 11.8 | 5.0 | 1.2 | 14.7 |
| 6 | 17.1 | 3.5 | 1.2 | 5.3 | 5.0 | 0.7 | 16.3 |
| 7 | 15.3 | 2.9 | 1.2 | 3.9 | 2.5 | 0.5 | 5.9 |
| 8 | 13.5 | 2.4 | 0.6 | 2.9 | 2.1 | 0.4 | 5.9 |
| 9 | 7.1 | 1.2 | 0.6 | 2.2 | 2.5 | 0.3 | 4.0 |
| 10 | 5.3 | 1.2 | 0.6 | 2.1 | 2.6 | 0.2 | 2.6 |
| Total of $U_3O_8$ eluted, mg | 205.6 | 199.5 | 164.0 | 175.4 | 151.6 | 103.4 | 198.8 |
| Total of $U_3O_8$ eluted, Percent | 85.5 | 83 | 68.5 | 73 | 63 | 43 | 83 |

Heating of the eluates for precipitation effected an average recovery of uranium of 97% of that present in the eluate.

It will be understood that the process of this invention is not only applicable to the treatment of monazite solutions, but that it is also usable for all processes concerned with the recovery of uranium from carbonate solutions.

It will also be understood that this invention is not to be limited to the details given herein, but that it may be modified within the scope of the appended claims.

What is claimed is:

1. The process of recovering uranium values from an alkali metal carbonate solution, which comprises contacting an anion exchange resin in its basic form with said solution whereby said uranium values are adsorbed thereon; thereafter contacting said uranium-containing resin with a carbonate eluant selected from the group consisting of ammonium carbonate, ammonium bicarbonate, and sodium bicarbonate of a concentration between 10 and 25% whereby the uranium values are desorbed from said resin and taken up by the eluant and said resin is immediately made ready for re-use; and heating the eluate whereby the carbonate is decomposed, the pH value is lowered, and the uranium values are precipitated.

2. The process of claim 1 wherein the eluant is ammonium carbonate.

3. The process of claim 1 wherein the eluant is ammonium bicarbonate.

4. The process of claim 1 wherein the eluant is sodium bicarbonate.

References Cited in the file of this patent

FOREIGN PATENTS 626,882    Great Britain _____ July 22, 1949

OTHER REFERENCES

Mellor: Comprehensive Treatise of Inorganic and Theoretical Chemistry, vol. 12, pp. 112–116 (1932); pub. by Longmans, Green & Co., London.

Bachelet et al.: Bulletin de la Societe Chimique de France, Jan.–Feb. 1952, pp 50–60.